United States Patent Office 2,959,515
Patented Nov. 8, 1960

---

2,959,515

CUPROUS DERIVATIVES OF SUBSTITUTED THIOUREAS

Maynard M. Baldwin, Columbus, Ohio, assignor, by mesne assignments, to Phelps Dodge Corporation, New York, N.Y., a corporation of New York No Drawing. Filed Apr. 6, 1956, Ser. No. 576,539

10 Claims. (Cl. 167—22)

This invention relates to copper-containing chemical compounds, compositions including the same, and to processes for the preparation and utilization of these compounds and compositions. More particularly, it relates to cuprous thione compounds and hydrohalide acid salts thereof, compositions including the same, and to processes for the preparation and utilization of these compounds and compositions as fungicides.

It is well known in the fungicide art that many copper compounds are active fungicides. However, in the field of plant pathology, it is recognized that the most active copper fungicidal compounds are those of appreciable water solubility. One disadvantage of water-soluble copper compounds is phytotoxicity. The more insoluble copper compounds have low phytotoxicity, but also are less fungitoxic. In the field of material preservation, such as for example, the protection of fabrics from fungi, copper compounds known to the art have the disadvantage of being colored.

According to the present invention, novel and useful copper compounds and compositions have been prepared that are highly fungitoxic, that have a low degree of phytotoxicity, and that have suitable solubility or dispersion properties. In addition, many compounds of this invention are white or a light color and are more useful in the field of material preservation than known copper fungicidal compounds.

An object of this invention is a new class of compounds and compositions.

Another object is a process for the preparation of cuprous thione compounds and hydrohalide acid salts thereof.

An additional object is to provide compounds, compositions, and processes for inhibiting, preventing, and arresting the attack by fungus and similar growth on wood, cotton, leather, fruit, seeds, plants, and other articles.

Further objects and advantages of this invention will be readily seen and appreciated as the same become better known and understood by reference to the following detailed description when considered in conjunction with the specific examples and the claims.

In the process of this invention, starting compounds having a functional group represented by a thiourea-type structural formula are used to obtain cuprous derivatives thereof, a restriction being that at least one nitrogen atom must have as one of its substituents a hydrogen atom to permit the isomerization

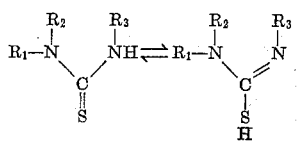

to occur. The nitrogen substituents, as represented by $R_1$, $R_2$, and $R_3$, may be selected from the group consisting of hydrogen, an alkyl radical having from 1 to 4 carbon atoms, and a substituted alkyl radical having from 1 to 4 carbon atoms having substituents selected from the group consisting of an amino radical, an imino radical, and a thio radical, with at least one of the said nitrogen substituents being selected from the group consisting of said alkyl radical and said substituted alkyl radical and with no more than one of the said nitrogen substituents being said substituted alkyl radical. Starting compounds and processes for preparing the same are known to those skilled in the art; and some starting compounds are available commercially.

In the process of the invention, the aforesaid starting compounds, having a functional group represented by the thiourea-type structural formula, are treated with a cuprous ion solution to obtain products having a characteristic group represented by the formula

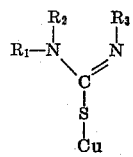

The cuprous ion solution may be prepared in situ with the starting compounds or may be prepared apart from the starting compounds. Where the cuprous ion solution is prepared apart from the starting compounds, the cuprous ion solution may be added to the starting compounds or the starting compounds may be added to the cuprous ion solution.

Cuprous ion solutions for the processes of this invention may be prepared from solutions of cuprous salts, or from solutions of cupric compounds by reduction with a reducing agent. Where the cuprous ion solution is prepared by reduction of a cupric compound, preferably the reducing agent should be an amount at least equal to the stoichiometric amount necessary to reduce the cupric compound, and the reducing agent should be of a type that will not react with the starting compound or product. The absence of cupric ions and reducing agents of a type that react with the starting compound or product assures the absence of undesirable side reactions. Where the cuprous solution is prepared from a cuprous salt, a small amount of a reducing agent may be included to assure the absence of cupric ions, for it is well known that cuprous salts frequently oxidize to cupric salt structure. The cuprous ion solution may be prepared in situ with the starting compound by the addition of a cupric compound to a solution containing the starting compound and a suitable reducing agent.

Where the cuprous ion solution is a hydrohalide acid solution, the product is a hydrohalide acid salt of a cuprous thione compound having an aforesaid characteristic group represented by the formula

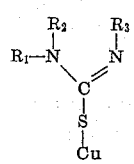

A hydrohalide acid is an acid selected from the group consisting of hydrochloric, hydrobromic, hydriodic, and hydrofluoric.

Where the cuprous ion solution is an alkaline or neutral solution and, however, one of the nitrogen substituents of the starting compound is an aforesaid substituted alkyl radical, the product is a cuprous thione compound having an aforesaid characteristic group.

Accordingly, the products of the process of the invention consist of cuprous thione compounds and cuprous thione hydrohalide acid salts. The cuprous thione compounds of the invention correspond to the formula

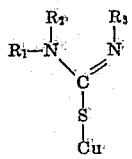

wherein $R_1$, $R_2$, and $R_3$ may be selected from the group consisting of hydrogen, an alkyl radical having from 1 to 4 carbon atoms, and a substituted alkyl radical having from 1 to 4 carbon atoms having substituents selected from the group consisting of an amino radical, an imino radical, and a thio radical, provided one of $R_1$, $R_2$, and $R_3$ is the said substituted alkyl radical. The cuprous thione hydrohalide acid salts of the invention correspond to the formula

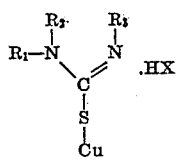

wherein $R_1$, $R_2$, and $R_3$ may be selected from the group consisting of hydrogen, an alkyl radical having from 1 to 4 carbon atoms, and a substituted alkyl radical having from 1 to 4 carbon atoms having substituents selected from the group consisting of an amino radical, an imino radical, and a thio radical provided said acid salts have at least one of $R_1$, $R_2$, and $R_3$ selected from the group consisting of the said alkyl radical and the said substituted alkyl radical with no more than one of $R_1$, $R_2$, and $R_3$ being said substituted alkyl radical, and wherein X is a halogen selected from the group consisting of chlorine, bromine, iodine, and fluorine.

Compounds having an aforesaid characteristic group, and compositions containing such compounds, are of value for the control of fungi. By the proper choice of substituents for the nitrogen atoms of the characteristic group, the physical nature, solubility, fungicidal activity, and other properties of the compounds and compositions may be varied to best suit the requirements.

The following are illustrative examples of the process of the present invention and the compounds resulting therefrom. These examples are to be construed as merely illustrative and not as limiting the scope of the present invention.

Example I 0.1 mole of dithiobiuret was dissolved in 500 milliliters of water at 85–90° C. A solution of 0.1 mole of cuprous chloride, dissolved in 500 milliliters of hot 2 N hydrochloric acid to which approximately 1 gram of hydroxylamine hydrochloride had been added, was added to the filtered dithiobiuret solution. A light-yellow precipitate, which formed, was separated by filtration, washed with water, and then made into a slurry with water. The slurry was treated with 0.3 N sodium hydroxide until it tested neutral. The slurry was then filtered, the precipitate collected, washed with water and alcohol. The product was air dried and then dried at 50° C. for 24 hours. The product had the formula

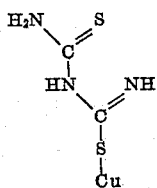

and the yield was approximately 95 percent of the calculated monocuprous-2-isodithiobiuret. Chemical analysis gave copper 31.9 percent, nitrogen 21.0 percent, and sulfur 32.7 percent. Theoretical analysis of monocuprous-2-isodithiobiuret is copper 32.2 percent, nitrogen 21.2 percent, and sulfur 32.4 percent.

Example II 0.05 mole of guanylthiourea phosphate was dissolved in 800 milliliters of water containing 0.3 mole of sodium hydroxide. The solution was filtered, warmed to 40° C. and 0.05 mole of hydroxylamine hydrochloride was added. 0.05 mole of cupric sulfate in 100 milliliters of water was then added slowly with vigorous stirring. A light-red precipitate, which formed, was filtered, collected, and washed until neutral with water, and then washed with methyl alcohol. The product was dried 24 hours at 50° C. The product had the formula

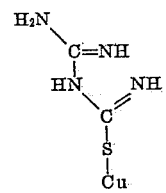

and was obtained with a yield of 6.0 grams or 66 percent of the theoretical yield of cuprous guanylthiourea.

Example III 0.05 mole of cuprous oxide was covered with 50 milliliters of concentrated hydrochloric acid. When the cuprous oxide had been converted to the cuprous chloride, as evident by the disappearance of the red cuprous oxide, the slurry of cuprous chloride was diluted with 100 milliliters of distilled water, whereupon the cuprous chloride dissolved. This solution was filtered rapidly.

0.1 mole of s-dimethylthiourea (N,N'-dimethylthiourea) dissolved in 20 milliliters of distilled water was added to the filtered solution of cuprous ion. A gummy precipitate, which formed on the addition, hardened upon heating the solution upon a steam bath for about 15 minutes. The precipitate was separated by filtration, ground with a mortar and pestle, and washed with distilled water until the washings were neutral. The material, a white powder, was washed with acetone, air dried, and dried further at 50° C. for 6 hours. The material had the formula

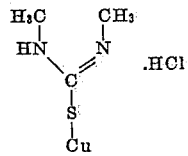

and was obtained in a yield of approximately 16 grams or approximately 79 percent of the theoretical yield for cuprous s-dimethylthiourea hydrochloride (cuprous N,N' dimethylthiourea hydrochloride).

Chemical analysis gave copper 31.7 percent, nitrogen 13.3 percent, sulfur 14.7 percent, and chlorine 17.3 percent. Theoretical analysis of cuprous dimethylthiourea hydrochloride (cuprous N,N' dimethylthiourea hydrochloride) is copper 31.3 percent, nitrogen 13.8 percent, sulfur 15.8 percent, and chlorine 17.4 percent.

Example IV 0.1 mole of s-diethylthiourea (N,N' diethylthiourea) dissolved in 250 milliliters of hot distilled water was added to a filtered solution of cuprous ion, prepared as described in Example III. The precipitate, which formed, was heated on a steam bath for approximately 15 minutes, separated by filtration, ground while wet with a mortar and pestle, collected, and washed well with ethyl alcohol. The product, a white powder, was air dried and then dried further at 50° C. for 6 hours. The material had the formula

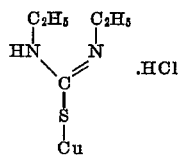

and was obtained in a yield of approximately 12 grams or approximately 52 percent of the theoretical yield for cuprous s-diethylthiourea hydrochloride (cuprous N,N' diethylthiourea hydrochloride).

Chemical analysis gave copper 27.7 percent, nitrogen 12.0 percent, sulfur 13.4 percent, and chlorine 14.5 percent. Theoretical analysis of cuprous s-diethylthiourea hydrochloride (cuprous N,N' diethylthiourea hydrochloride) is copper 27.6 percent, nitrogen 12.0 percent, sulfur 13.8 percent, and chlorine 15.3 percent.

*Example V*

0.28 mole of 1,1 diethylthiourea (N,N diethylthiourea), having a melting point of 100–102° C., was dissolved in 100 milliliters of distilled water and then added to a filtered solution of cuprous ion. The cuprous ion solution was prepared as described in Example III, except 0.015 mole of cuprous oxide was dissolved in 20 milliliters of concentrated hydrochloric acid and then diluted with 40 milliliters of distilled water. The precipitate, which formed, was heated on a steam bath for approximately 15 minutes, separated by filtration, ground while wet with a mortar and pestle, collected, and washed well with distilled water until the washings were neutral. The material was washed with acetone, air dried, and then dried further at 50° C. for 6 hours. The material had the formula

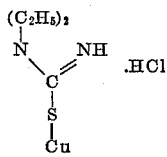

and was obtained in a yield of approximately 5.5 grams or approximately 85 percent of the theoretical yield for cuprous 1,1 diethylthiourea hydrochloride (cuprous N,N diethylthiourea hydrochloride).

Chemical analysis gave copper 22.5 percent, nitrogen 11.7 percent, sulfur 13.7 percent, and chlorine 14.9 percent. Theoretical analysis for cuprous 1,1 diethylthiourea hydrochloride (cuprous N,N diethylthiourea hydrochloride) is copper 27.6 percent, nitrogen 12.0 percent, sulfur 13.8 percent, and chlorine 15.3 percent.

The foregoing examples illustrate the prepartion of cuprous thione derivatives of starting compounds containing a functional group, represented by the thiourea-type structural formula, wherein at least one nitrogen has as one of its substituents a hydrogen atom. The examples illustrate nitrogen substituents that permit the utilization of starting compounds having a chain-type structural formula having a thiourea-type functional group.

As is well known by those skilled in the art, the choice of substituents for organic compounds influences the physical properties of the compounds. Suitable selections for substituents for the nitrogen atoms of the functional group, represented by the thiourea-type structural formula, will be obvious to those skilled in art, where it is desired to modify the starting compounds and cuprous thione derivatives thereof to best suit application requirements, and are included within the scope of the invention.

In the formation of the products of the invention, wherein the cuprous ion solution is produced by the reduction of a cupric compound, although hydroxyl amine hydrochloride has been specifically illustrated as a reducing agent, it is to be understood the invention is not so limited and other suitable reducing agents may be used. For example, dextrose is a suitable reducing agent. Reducing agents that react with the starting compounds or the cuprous derivatives formed thereof should be avoided.

In the formation of the products of the invention, wherein the cuprous ion solution is prepared from a cuprous salt and a solvent, it is preferred that a small amount of a suitable reducing agent be included in the cuprous ion solution to assure the absence of cupric ions. Where hydrohalide acid is present in the cuprous ion solution, the product, a cuprous thione hydrohalide acid salt derivative, is obtained without the cuprous thione compound being isolated.

The value and utility of the products of this invention, and compositions including the same, in inhibiting, preventing, and arresting the growth of fungi and similar growth have been shown by tests.

Indicative results of the fungitoxicity of materials may be obtained according to the method of the Committee on Standardization of Fungicidal Tests [Phytopathology 37, 354–356 (1947)]. By this method successive test tube dilutions of the material in solution or suspension are made with slide fungi germination tests run on the various dilutions. In this method materials are rated according to the concentration needed to inhibit 50 percent of the fungus spores. Compounds that can effect this inhibition at a concentration of less than 1 part per million are rated AA, of 1 to 10 parts per million are rated A, of 10 to 100 parts per million are rated B, of 100 to 1000 parts per million are rated C, and of greater than 1000 parts per million are rated D. Tests were made on compounds of this invention according ot the method of the Committee on Standardization of Fungicidal Tests and are reported in Table 1.

In Table 1, specimen No. 1 is basic copper sulfate; No. 2 is cuprous s-dimethylthiourea hydrochloride (cuprous N,N' dimethylthiourea hydrochloride) prepared by the method as illustrated in Example III; No. 3 is cuprous s-diethylthiourea hydrochloride (cuprous N,N' diethylthiourea hydrochloride) prepared by the method as illustrated in Example IV; No. 4 is cuprous 1,1 diethylthiourea hydrochloride (cuprous N,N diethylthiourea hydrochloride) prepared by the method as illustrated in Example V; and No. 5 is monocuprous-2-iso-dithiobiuret prepared by the method as illustrated in Example I.

*Table 1*

| No. | Compound | Fungi | |
|---|---|---|---|
| | | Alternaria oleracea | Monilinia fructicola |
| 1 | Basic Copper Sulfate | B, B | B, B. |
| 2 | Cuprous N,N' dimethylthiourea hydrochloride. | B | B. |
| 3 | Cuprous N,N' diethylthiourea hydrochloride. | B | B. |
| 4 | Cuprous N,N diethylthiourea hydrochloride. | B | B. |
| 5 | Monocuprous-2-iso-dithiobiuret | C | C. |

The tests showed that cuprous s-dimethylthiourea hydrochloride (cuprous N,N' dimethylthiourea hydrochloride), cuprous s-diethylthiourea hydrochloride, and cuprous 1,1-diethylthiourea hydrochloride (cuprous N,N diethylthiourea hydrochloride) were the equivalent of the conventional fungicide, basic copper sulfate, and that monocuprous-2-iso-dithiobiuret was almost the equivalent of basic copper sulfate in inhibiting the germination of the fungi, *Alternaria oleracea* and *Monilinia fructicola.*

The methods for applying the compounds and compositions containing the same, may be varied to include dusting or tumbling with powders, spraying with solutions, emulsions or suspensions, soaking in solutions, or applying directly as a paste or coating. An antifungal composition of the invention may comprise a compound of the invention and a carrier selected from a group consisting of a finely divided solid material, a liquid material, and mixtures thereof. For example, the cuprous thione hydrochloride products of Examples III, IV, and V are readily dispersible in water to give finely divided, slow settling suspensions exceptionally adaptable for spray application to growing plants and for slurry applications to seeds. The dry, finely divided powder from the spray clings tenaciously to plant foliage.

Another process for antifungal treating of an article comprises coating and/or impregnating the article with a starting compound of the invention, whereby said starting compound is retained, at least in part, by said article, and treating the coated and/or impregnated article with a cuprous ion solution of the invention to form a fungal resistant composite consisting of said article and a product of this invention.

While preferred compounds, compositions, and methods have been shown and described, the invention may be embodied in other specific forms without departing from the spirit or essential attributes thereof, and the present embodiments illustrated and described are to be considered in all respects as illustrative and not restrictive, reference being made to the appended claims rather than to the foregoing description to indicate the scope of the invention.

What is claimed is:

1. An antifungal composition comprising a major amount of a carrier and a minor amount of an antifungal agent selected from the group consisting of a cuprous thione compound corresponding to the formula

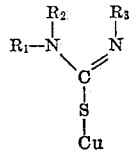

and hydrohalide acid salts thereof, wherein $R_1$, $R_2$, and $R_3$ are nitrogen substituents selected from the group consisting of hydrogen, an alkyl radical, a substituted alkyl radical having both thio and amino radical substituents, and a substituted alkyl radical having both imino and amino radical substituents, said alkyl and substituted alkyl radicals having from 1 to 4 carbon atoms, said hydrohalide acid salts having at least one of said alkyl and substituted alkyl radicals and no more than one of said substituted alkyl radicals for one of said nitrogen substituents, and said cuprous thione compound having one of said substituted alkyl radicals for one of said nitrogen substituents.

2. In a process for antifungal treatment of articles, the steps comprising: coating an article with a compound corresponding to the formula

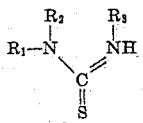

wherein $R_1$, $R_2$, and $R_3$ are nitrogen substituents selected from the group consisting of hydrogen, an alkyl radical, a substituted alkyl radical having both thio and amino radical substituents, and a substituted alkyl radical having both imino and amino radical substituents, said alkyl and substituted alkyl radicals having from 1 to 4 carbon atoms; and contacting said coated article with a cuprous ion solution, free from cupric ions by the presence therein of a reducing agent, to provide on said article a coating consisting essentially of an antifungal agent selected from the group consisting of a cuprous thione compound corresponding to the formula

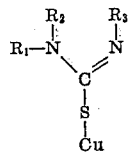

and hydrohalide acid salts thereof, wherein $R_1$, $R_2$, and $R_3$ are nitrogen substituents selected from the group consisting of hydrogen, an alkyl radical, a substituted alkyl radical having both thio and amino radical substituents, and a substituted alkyl radical having both imino and amino radical substituents, said alkyl and substituted alkyl radicals having from 1 to 4 carbon atoms, said hydrohalide acid salts having at least one of said alkyl and substituted alkyl radicals and no more than one of said substituted alkyl radicals for one of said nitrogen substituents, and said cuprous thione compound having one of said substituted alkyl radicals for one of said nitrogen substituents.

3. A process for control of fungi which comprises applying to a plant an antifungal agent selected from the group consisting of a cuprous thione compound corresponding to the formula

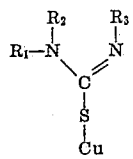

and hydrohalide acid salts thereof, wherein $R_1$, $R_2$, and $R_3$ are nitrogen substituents selected from the group consisting of hydrogen, an alkyl radical, a substituted alkyl radical having both thio and amino radical substituents, and a substituted alkyl radical having both imino and amino radical substituents, said alkyl and substituted alkyl radicals having from 1 to 4 carbon atoms, said hydrohalide acid salts having at least one of said alkyl and substituted alkyl radicals and no more than one of said substituted alkyl radicals for one of said nitrogen substituents, and said cuprous thione compound having one of said substituted alkyl radicals for one of said nitrogen substituents.

4. A process for control of fungi which comprises applying to a plant a cuprous thione compound corresponding to the formula

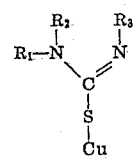

wherein $R_1$, $R_2$, and $R_3$ are nitrogen substituents selected from the group consisting of hydrogen, an alkyl radical, a substituted alkyl radical having both thio and amino radical substituents, and a substituted alkyl radical having both imino and amino radical substituents, said alkyl and substituted alkyl radicals having from 1 to 4 carbon atoms, said cuprous thione compound having one of said substituted alkyl radicals for one of said nitrogen substituents.

5. A process for control of fungi which comprises applying to a plant a cuprous thione hydrohalide acid salt corresponding to the formula

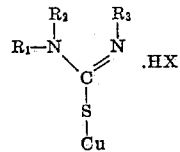

wherein $R_1$, $R_2$, and $R_3$ are nitrogen substituents selected from the group consisting of hydrogen, an alkyl radical, a substituted alkyl radical having both thio and amino radical substituents, and a substituted alkyl radical having both imino and amino radical substituents, said alkyl and substituted alkyl radicals having from 1 to 4 carbon atoms, said cuprous thione hydrohalide acid salt having at least one of said alkyl and substituted alkyl radicals and no more than one of said substituted alkyl radicals for one of said nitrogen substituents, and wherein X is a halogen selected from the group consisting of chlorine, bromine, iodine, and fluorine.

6. An antifungal composition comprising a minor proportion of cuprous N,N'-dimethylthiourea hydrochloride and a major proportion of a carrier selected from the group consisting of a finely divided solid material, a liquid material, and mixtures thereof.

7. An antifungal composition comprising a minor proportion of cuprous N,N'-diethylthiourea hydrochloride and a major proportion of a carrier selected from the group consisting of a finely divided solid material, a liquid material, and mixtures thereof.

8. An antifungal composition comprising a minor proportion of cuprous N,N-diethylthiourea hydrochloride and a major proportion of a carrier selected from the group consisting of a finely divided solid material, a liquid material, and mixtures thereof.

9. A process for control of fungi which comprises applying to a plant a composition comprising a minor proportion of cuprous N,N'-dimethylthiourea hydrochloride and a major proportion of a carrier selected from the group consisting of a finely divided solid material, a liquid material and mixtures thereof.

10. A process for control of fungi which comprises applying N,N'-dimethylthiourea hydrochloride in water to a plant.

References Cited in the file of this patent

UNITED STATES PATENTS

| | | |
|---|---|---|
| 1,734,519 | Hand | Nov. 5, 1929 |
| 2,155,328 | Paquin | Apr. 18, 1939 |
| 2,323,445 | Bockmuhl et al. | July 6, 1943 |
| 2,655,534 | Searle | Oct. 13, 1953 |

FOREIGN PATENTS

| | | |
|---|---|---|
| 565,064 | Germany | Nov. 25, 1932 |

OTHER REFERENCES

Rathke: Berichte, vol. 17, 1884, pp. 297–309.
Gregory: Uses and Applications of Chemicals and Related Materials, New York, 1939, pp. 210, 211.

UNITED STATES PATENT OFFICE
CERTIFICATION OF CORRECTION

Patent No. 2,959,515                        November 8, 1960

Maynard M. Baldwin

It is hereby certified that error appears in the above numbered patent requiring correction and that the said Letters Patent should read as corrected below.

In the grant, lines 1, 2, and 3, for "assignor, by mesne assignments, to Phelps Dodge Corporation, of New York, N. Y., a corporation of New York," read -- assignor, by mesne assignments to Phelps Dodge Corporation, of New York, N. Y., a corporation of New York, Anaconda Copper Mining Company, of New York, N. Y., a corporation of Montana, and Kennecott Copper Corporation, of New York, N. Y., a corporation of New York, --; line 12, for "Phelps Dodge Corporation, its successors" read -- Phelps Dodge Corporation, Anaconda Copper Mining Company, and Kennecott Copper Corporation, their sucessors --; in the heading to the printed specification, lines 4, 5, and 6, for "assignor, by mesne assignments, to Phelps Dodge Corporation, New York, N. Y., a corporation of New York" read -- assignor, by mesne assignments, to Phelps Dodge Corporation, New York, N. Y., a corporation of New York, Anaconda Copper Mining Company, New York, N. Y., a corporation of Montana, and Kennecott Copper Corporation, New York, N. Y., a corporation of New York --.

Signed and sealed this 18th day of April 1961.

(SEAL)
Attest:

ERNEST W. SWIDER
Attesting Officer

DAVID L. LADD
Commissioner of Patents